US012742411B2

(12) United States Patent
Akimoto

(10) Patent No.: US 12,742,411 B2
(45) Date of Patent: Sep. 22, 2026

(54) TRANSPORTATION VEHICLE

(71) Applicant: Hitachi Construction Machinery Co., Ltd., Tokyo (JP)

(72) Inventor: Hiroki Akimoto, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 119 days.

(21) Appl. No.: 18/863,700

(22) PCT Filed: Jun. 27, 2023

(86) PCT No.: PCT/JP2023/023711
§ 371 (c)(1),
(2) Date: Nov. 7, 2024

(87) PCT Pub. No.: WO2024/004979
PCT Pub. Date: Jan. 4, 2024

(65) Prior Publication Data

US 2026/0194001 A1 Jul. 9, 2026

(30) Foreign Application Priority Data

Jun. 29, 2022 (JP) ................................ 2022-104154

(51) Int. Cl.
*F01P 5/12* (2006.01)
*F01P 5/04* (2006.01)
(Continued)

(52) U.S. Cl.
CPC *F01P 5/12* (2013.01); *F01P 5/04* (2013.01); *F01P 11/02* (2013.01); *F04D 25/04* (2013.01);
(Continued)

(58) Field of Classification Search
CPC ...... F01P 5/12; F01P 5/04; F01P 11/02; F01P 2025/08; F15B 21/0423; F15B 15/18; F04D 25/04
(Continued)

(56) References Cited

U.S. PATENT DOCUMENTS 5,036,676 A * 8/1991 Dudley ................ F24F 1/0003 62/186
5,440,895 A * 8/1995 Bahel ...................... F24F 11/38 62/211
(Continued)

FOREIGN PATENT DOCUMENTS

JP 64-73109 A 3/1989
JP 2-101022 U 8/1990
(Continued)

OTHER PUBLICATIONS

International Preliminary Report on Patentability (PCT/IB/338 & PCT/IPEA/409) issued in PCT Application No. PCT/JP2023/023711 dated Jan. 2, 2025 (5 pages).
(Continued)

*Primary Examiner* — Claire E Rojohn, III
(74) *Attorney, Agent, or Firm* — Crowell & Moring LLP

(57) ABSTRACT

Provided is a transportation vehicle including: a heat exchanger that cools a fluid to be cooled; a pump that circulates the fluid to be cooled; a temperature sensor hat detects a temperature of the fluid to be cooled; a fan that blows air to the heat exchanger; and a hydraulic motor that drives the fan, in which a rotation speed of the pump rises from a first pump rotation speed to a second pump rotation speed according to a rise in the detected temperature when the temperature detected by the temperature sensor is between a first temperature and a second temperature, a rotation speed of the hydraulic motor rises from a first motor rotation speed to a second motor rotation speed according to
(Continued)

a rise in the detected temperature when the detected temperature is between a third temperature and a fourth temperature, the third temperature is set higher than the first temperature, and when the detected temperature rises, the rotation speed of the pump starts to rise before the rotation speed of the hydraulic motor starts to rise, so that it is possible to improve fuel consumption and suppress noise by suppressing the driving frequency and the rotation speed of the fan.

6 Claims, 8 Drawing Sheets

(51) Int. Cl.
*F01P 11/02* (2006.01)
*F04D 25/04* (2006.01)
*F15B 15/18* (2006.01)
*F15B 21/0423* (2019.01)
*F16D 65/78* (2006.01)

(52) U.S. Cl.
CPC .......... *F15B 15/18* (2013.01); *F15B 21/0423* (2019.01); *F01P 2025/08* (2013.01); *F16D 65/78* (2013.01)

(58) Field of Classification Search
USPC .......................................................... 165/287
See application file for complete search history.

(56) References Cited

U.S. PATENT DOCUMENTS 5,463,876 A * 11/1995 Bessler .............. G05D 23/1913 62/211
6,349,882 B1 2/2002 Kita et al.
7,270,090 B2 * 9/2007 Surnilla .................. F01P 7/164 123/41.02
9,574,810 B1 * 2/2017 West ....................... F25B 49/02
9,683,563 B2 * 6/2017 Caillat ................... G01H 17/00
11,959,679 B2 * 4/2024 Mullin .................. F04D 27/004
12,181,101 B2 * 12/2024 Jauss ...................... B60K 11/02
2002/0152972 A1 * 10/2002 Iwasaki ................... F01P 7/167 123/41.44
2006/0059930 A1 * 3/2006 Eisenhour ............ B60H 1/3216 62/157
2007/0006824 A1 1/2007 Saotome
2007/0006826 A1 1/2007 Laukemann
2009/0211542 A1 * 8/2009 Guerrero ............. F02B 29/0443 123/41.13
2011/0011076 A1 1/2011 Tanaka et al.
2014/0159378 A1 * 6/2014 Wright ................. H02K 7/1823 290/1 A
2015/0308441 A1 * 10/2015 Magaziner ............... F24F 11/77 417/326
2016/0131016 A1 * 5/2016 Mehravaran ........ F02B 29/0493 123/41.1
2016/0201582 A1 7/2016 Aoki et al.
2021/0003249 A1 * 1/2021 West ....................... F16N 39/06
2023/0358158 A1 * 11/2023 Byun ....................... F01P 11/10
2025/0010690 A1 * 1/2025 Liu .................. H01M 10/6569
2026/0042439 A1 * 2/2026 Akimoto ............... B60W 20/16

FOREIGN PATENT DOCUMENTS

JP 9-79211 A 3/1997
JP 10-259728 A 9/1998
JP 2001-182535 A 7/2001
JP 2006-522261 A 9/2006
JP 2007-16659 A 1/2007
JP 2009-228874 A 10/2009
JP 2013-44248 A 3/2013
JP 2015-140767 A 8/2015

OTHER PUBLICATIONS

International Search Report (PCT/ISA/210) issued in PCT Application No. PCT/JP2023/023711 dated Aug. 29, 2023 with English translation (7 pages).
Japanese-language Written Opinion (PCT/ISA/237) issued in PCT Application No. PCT/JP2023/023711 dated Aug. 29, 2023 with English translation (7 pages).
Japanese-language International Preliminary Report on Patentability (PCT/IPEA/409) issued in PCT Application No. PCT/JP2023/023711 dated Jun. 20, 2024, including Annexes with partial English Translation (16 pages).

* cited by examiner

TRANSPORTATION VEHICLE

TECHNICAL FIELD

The present invention relates to a transportation vehicle such as a dump truck.

BACKGROUND ART

A fan for blowing air to a heat exchanger such as an oil cooler mounted on a dump truck for mining, an excavator for mining, a truck travelling on a public road, or the like is generally driven by being directly coupled to an engine. However, there are many cases where an electrically driven drive fan or a hydraulic drive fan is adopted due to the reason such as an increase in the size of a cooling system and restrictions or the like of the arrangement of a heat exchanger and an engine. In particular, a hydraulic drive fan tends to be adopted for a large-size fan that is unsuitable for electrically driven drive. As a cooling system adopting such a hydraulic drive fan, there has been known a cooling system that has a plurality of fans and changes the number of fans driven according to the measured temperature of a fluid to be cooled (Patent Document 1).

PRIOR ART DOCUMENT

Patent Document

Patent Document 1: JP-1998-259728-A

SUMMARY OF THE INVENTION

Problem to be Solved by the Invention

However, in the system of Patent Document 1 in which the number of rotating fans is changed for the amount of heat radiation to be required, the control of the amount of heat radiation depends only on the amount of air flow, and when heat radiation is needed, it is necessary to drive at least one fan.

As described above, many hydraulic drive fans are large in size. The power required to drive a large-size fan is large, and if the driving frequency and the rotation speed of the fan increases, the fuel consumption of the transportation vehicle deteriorates. In addition, the operation noise of the fan can lead to an increase in fatigue of an operator and a noise problem in the neighborhood.

An object of the present invention is to provide a transportation vehicle capable of improving fuel consumption and suppressing noise by suppressing the driving frequency and the rotation speed of a fan.

Means for Solving the Problem

In order to achieve the above object, the present invention provides a transportation vehicle including a vehicle body frame and a vessel provided on the vehicle body frame so as to be capable of rising and falling, the vehicle including: a tank that stores a fluid to be cooled; a heat exchanger that cools the fluid to be cooled; a pump that circulates the fluid to be cooled between the tank and the heat exchanger; a temperature sensor that detects a temperature of the fluid to be cooled; a fan that blows air to the heat exchanger; a hydraulic motor that drives the fan; and a controller that controls the pump and the hydraulic motor according to the temperature sensed by the temperature sensor, in which the controller stores a first pump rotation speed, a first temperature associated with the first pump rotation speed, a second pump rotation speed higher than the first pump rotation speed, a second temperature associated with the second pump rotation speed, a first motor rotation speed, a third temperature associated with the first motor rotation speed, a second motor rotation speed higher than the first motor rotation speed, and a fourth temperature associated with the second motor rotation speed, is configured to raise a rotation speed of the pump from the first pump rotation speed to the second pump rotation speed according to a rise in the sensed temperature when the sensed temperature is between the first temperature and the second temperature, and raise a rotation speed of the hydraulic motor from the first motor rotation speed to the second motor rotation speed according to a rise in the sensed temperature when the sensed temperature is between the third temperature and the fourth temperature, and the third temperature is set higher than the first temperature, and the controller is configured to start the rotation speed of the pump to be raised from the first pump rotation speed when the sensed temperature reaches the first temperature from a temperature lower than the first temperature, raise the rotation speed of the pump from the first pump rotation speed without raising the rotation speed of the hydraulic motor until the third temperature is reached when the sensed temperature rises beyond the first temperature, and start the rotation speed of the hydraulic motor to be raised from the first motor rotation speed when the sensed temperature reaches the third temperature.

Advantages of the Invention

According to the present invention, it is possible to improve fuel consumption and suppress noise by suppressing the driving frequency and the rotation speed of a fan.

MODES FOR CARRYING OUT THE INVENTION

Embodiments of the present invention will be described below by using the drawings.

First Embodiment

Transportation Vehicle

Figure 1:
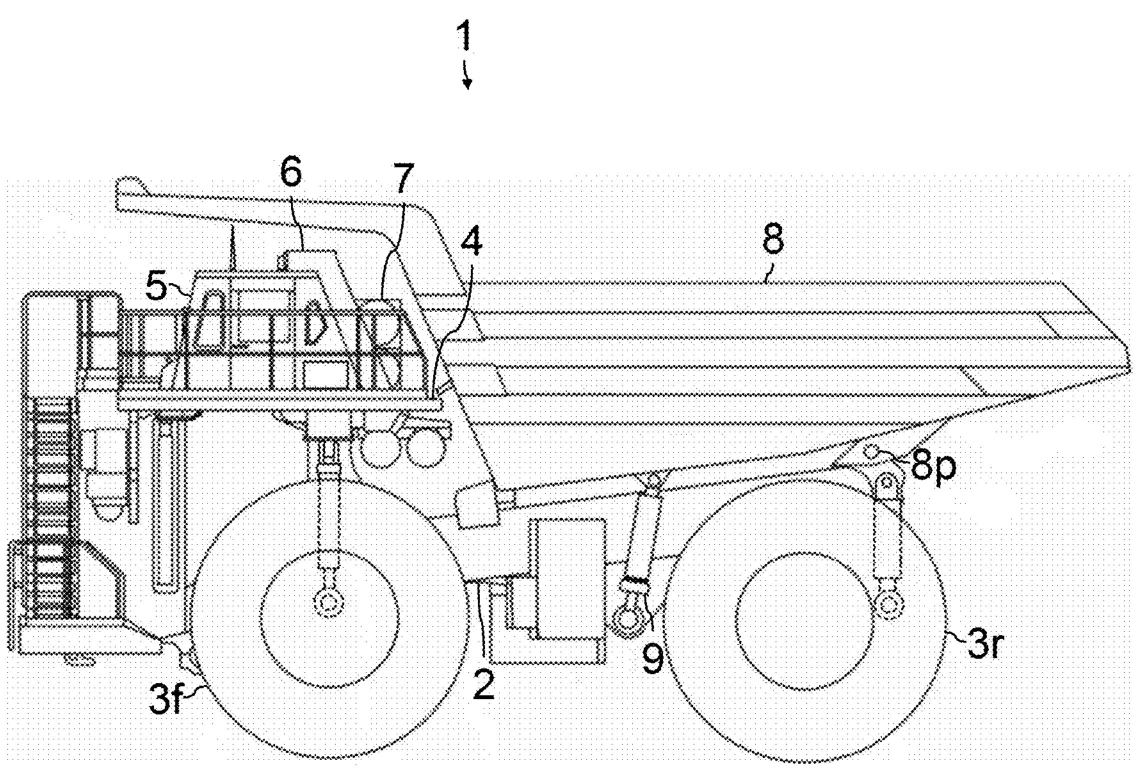
FIG. 1 is a side view of a dump truck as an example of a transportation vehicle according to a first embodiment of the present invention.

FIG. 1 is a side view of a dump truck as an example of a transportation vehicle according to a first embodiment of the present invention. It is assumed that the left and right in FIG. 1 are the front and rear of a dump truck 1, respectively.

The dump truck 1 depicted in the drawing is provided with a vehicle body frame 2 and a plurality of wheels rotatably provided to the vehicle body frame 2. The wheels include left and right front wheels 3*f* and left and right rear wheels 3*r*. One front wheel 3*f* is arranged at each of both left and right ends of a front portion of the vehicle body frame 2. Two rear wheels 3*r* are arranged at each of both left and right ends of a rear portion of the vehicle body frame 2. The front wheels 3*f* are steering wheels steered in accordance with a steering angle input through a steering device or the like, and are driven wheels that follow the rear wheels 3*r* through the surface of a travelling road on which the dump truck 1 travels. A travelling motor (not illustrated) and a reduction gear 11 (FIG. 2) for adjusting the rotation speed of the rear wheels 3*r* are individually coupled to each rotational shaft of the left and right rear wheels 3*r* as drive wheels.

In addition, the dump truck 1 is provided with a deck 4, a cab 5, a control cabinet 6, and a plurality of grid boxes 7. The deck 4 is a floor on which an operator walks, and is arranged above the front wheels 3*f*. The cab 5 is an operation room in which an operator rides, and is installed on the upper surface of the deck 4. The cab 5 is provided with operation pedals (an accelerator pedal, a brake pedal, and the like) for commanding the travelling speed of the dump truck 1 and the above-described steering device, in addition to a driving seat on which the operator sits. The control cabinet 6 is a room for accommodating various kinds of electric power equipment and is mounted at a front portion of the vehicle body. The grid box 7 is a device for diffusing surplus energy resulting from regenerative power generated during braking as heat, and is arranged on the right side of the control cabinet 6.

The dump truck 1 is further provided with a vessel 8 and a hoist cylinder 9. The vessel 8 is a platform for loading a cargo such as earth and sand, or ore, is coupled to the vehicle body frame 2 through a hinge pin 8*p*, and rises and falls with respect to the vehicle body frame 2. The hoist cylinder 9 couples the vehicle body frame 2 and the vessel 8 to each other at a position in front of the hinge pin 8*p*, and expands and contracts to allow the vessel 8 to rise and fall. In FIG. 1, a prime mover 15 (FIG. 2), a power generator 16 (FIG. 2), and the like are arranged at positions between the left and right front wheels 3*f* of the vehicle body frame 2, and the control cabinet 6 is mounted above these equipment. An electric power controller 30 (FIG. 5) is stored inside the control cabinet 6. The electric power controller 30 is, for example, an inverter.

Figure 2:
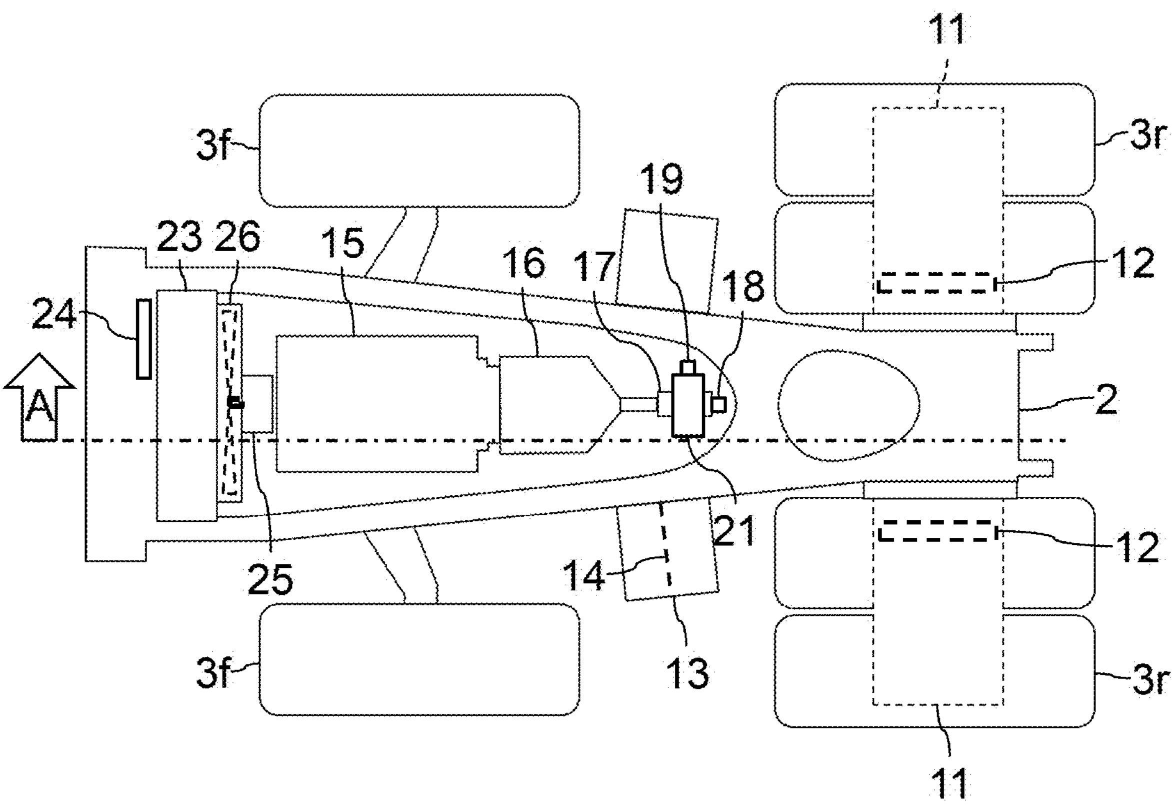
FIG. 2 is a plan view of a vehicle body frame of the transportation vehicle according to the first embodiment of the present invention.
Figure 3:
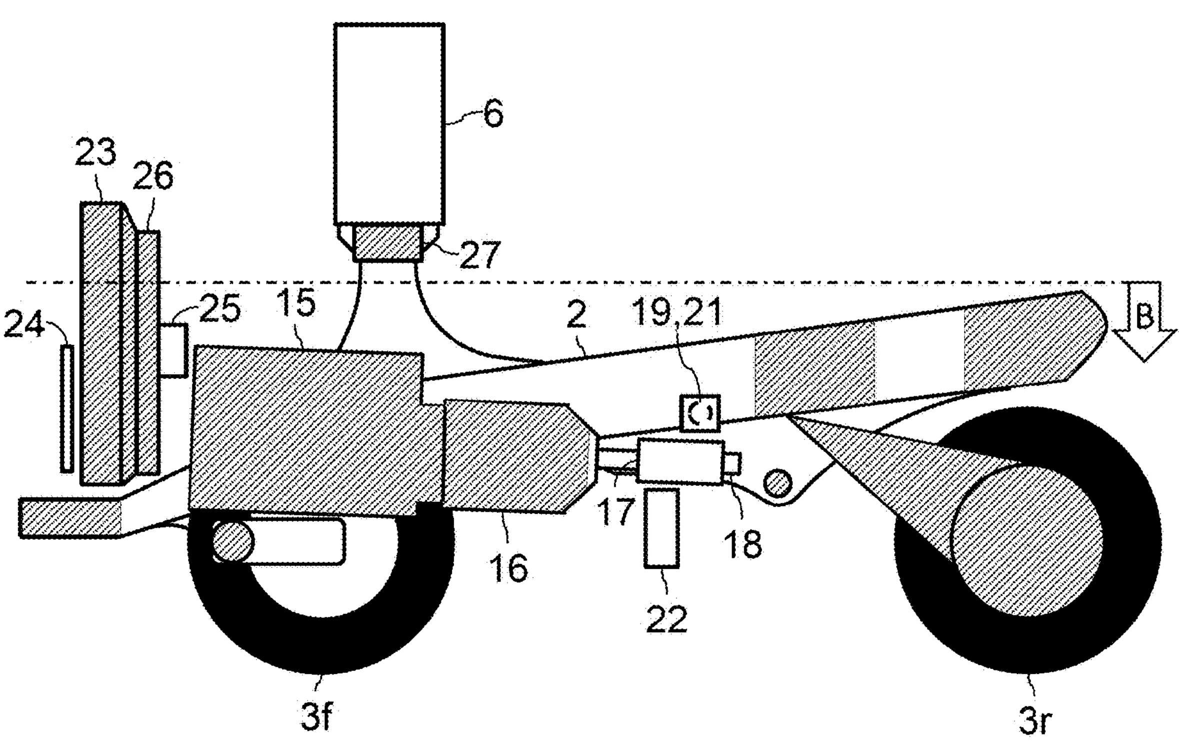
FIG. 3 is a side view of the vehicle body frame of the transportation vehicle according to the first embodiment of the present invention.

FIG. 2 is a plan view of the vehicle body frame, and FIG. 3 is a side view thereof. Technically, FIG. 2 depicts a cross-sectional view taken along the arrow B in FIG. 3, and FIG. 3 depicts a cross-sectional view taken along the arrow A in FIG. 2. A wet brake 12 is mounted inside each of the left and right reduction gears 11 that individually support the left and right rear wheels 3*r*. The wet brake 12 is a brake for cooling heat generated during braking, by using oil, and a wet brake cooling system (FIG. 4) for cooling the heated oil is mounted on the dump truck 1.

Although not illustrated, a plate as a stationary body fixed to the vehicle body side and a plate that rotates at the same speed as the reduction gear 11 are provided inside the wet brake 12, and the dump truck 1 is braked by these two plates being pressed. A tank 13 that stores brake cooling oil and hydraulic working fluid is installed on the left side surface of the vehicle body frame 2. The inside of the tank 13 is partitioned by a partition 14 such that the brake cooling oil and the hydraulic working fluid are not mixed.

The prime mover 15 is mounted at a front portion of the vehicle body frame 2 with a posture in which the output shaft is oriented forward and backward. In the present embodiment, the prime mover 15 is an engine (internal combustion engine). The power generator 16, a hydraulic pump 17, and a pilot pump 18 are connected to the output shaft of the prime mover 15. A cooling hydraulic pump 19 that circulates the brake cooling oil between the tank 13 and a heat exchanger 24 and an electrically driven motor 21 that drives the hydraulic pump 19 are installed above the hydraulic pump 17. The power required to drive the hydraulic pump 19 is smaller than that required to drive a hydraulic motor 25.

A control valve 22 is installed below the hydraulic pump 17. A radiator 23 is installed on the front surface of the vehicle body of the dump truck 1. The heat exchanger (brake cooling oil cooler) 24 that cools the brake cooling oil, which is a fluid to be cooled, is mounted on the front side of the radiator 23. The hydraulic motor 25 is installed on the rear side of the radiator 23, and a fan 26 is connected to the output shaft of the hydraulic motor 25. The fan 26 is driven by the hydraulic motor 25 to blow air to the radiator 23 and the heat exchanger 24.

A beam 27 extending in the left and right directions is installed at an upper portion of the vehicle body frame 2, and the control cabinet 6 is installed at an upper portion of the beam 27.

Hydraulic Circuit

Figure 4:
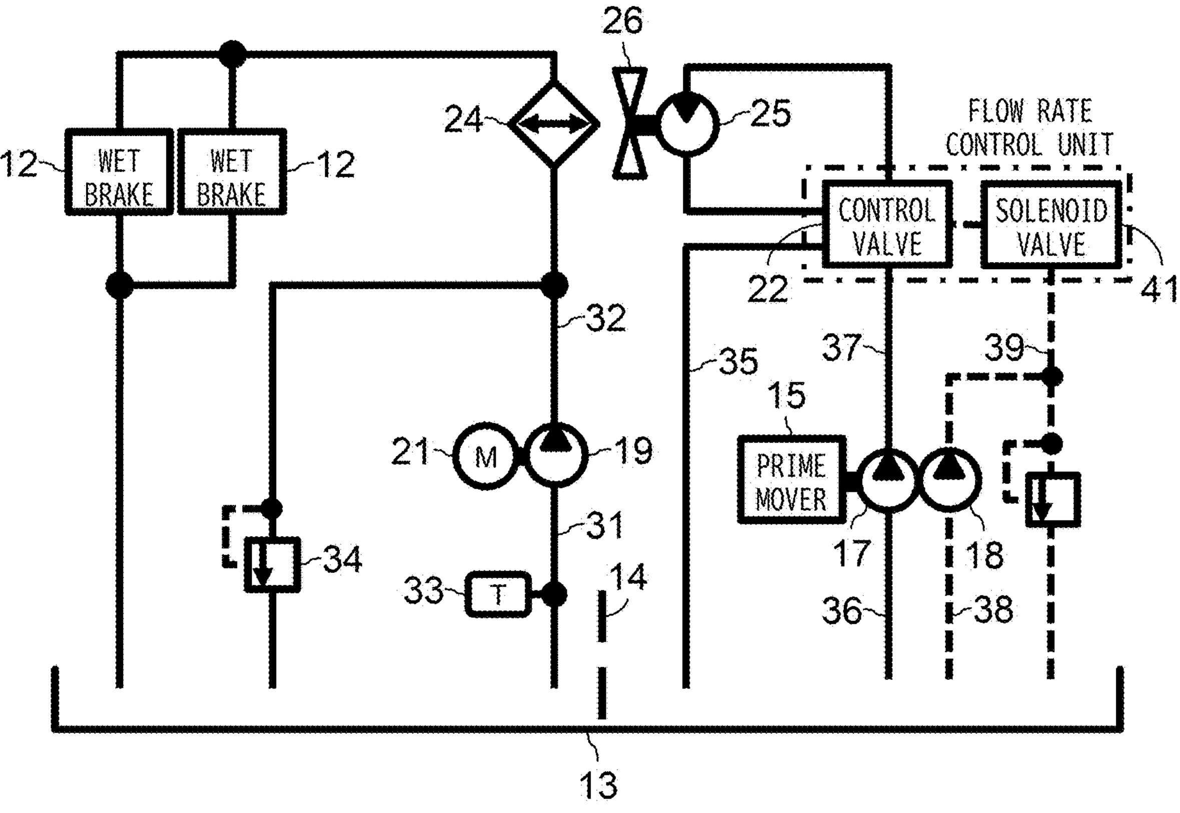
FIG. 4 is a hydraulic circuit diagram of the transportation vehicle according to the first embodiment of the present invention.

FIG. 4 is a hydraulic circuit diagram of the dump truck 1. When the hydraulic pump 19 is driven by the electrically driven motor 21, the brake cooling oil is sucked into the hydraulic pump 19 from the tank 13 through a suction line 31 and is delivered to a delivery line 32 of the hydraulic pump 19. The brake cooling oil delivered from the hydraulic pump 19 is fed into the heat exchanger 24 through the delivery line 32, and is returned to the tank 13 through the wet brake 12 after being cooled in the heat exchanger 24. The delivery line 32 is provided with a relief valve 34. The relief valve 34 regulates the maximum pressure of the delivery line 32. In addition, a temperature sensor 33 is installed in the suction line 31. The temperature of the brake cooling oil flowing through the suction line 31 is measured by the temperature sensor 33. The measured temperature of the brake cooling oil is output from the temperature sensor 33 and input to a controller 50 (described later).

On the other hand, the hydraulic pump 17 and the pilot pump 18 are driven by the prime mover 15. The hydraulic pump 17 sucks the hydraulic working fluid from the tank 13 through the suction line 36, and delivers a hydraulic fluid to the delivery line 37. The pilot pump 18 sucks the hydraulic working fluid from the tank 13 through a suction line 38, and delivers a hydraulic fluid to a delivery line 39. The maximum pressures of the delivery lines 37 and 39 are also regulated by a relief valve as similar to the relief valve 34.

The control valve 22 connects the hydraulic pump 17, the tank 13 (center bypass hydraulic line 35), and the hydraulic motor 25 to each other. The spool of the control valve 22 is driven by a pilot pressure generated by a solenoid valve 41 using the hydraulic fluid from the pilot pump 18 as a source pressure. The hydraulic working fluid delivered from the hydraulic pump 17 is fed to the center bypass hydraulic line 35 and is returned to the tank 13 through the center bypass hydraulic line 35. When the spool of the control valve 22 is moved, the center bypass hydraulic line 35 is narrowed, and a connection opening (not illustrated) to the hydraulic motor 25 is opened according to the moving amount of the spool to supply the hydraulic fluid to the hydraulic motor 25. The rotation speed of the hydraulic motor 25 is controlled according to the supply flow rate of the hydraulic fluid, that is, the moving amount of the spool. The hydraulic fluid that has driven the hydraulic motor 25 is returned to the control valve 22 and is returned to the tank 13 through the center bypass hydraulic line 35.

Electric Circuit

Figure 5:
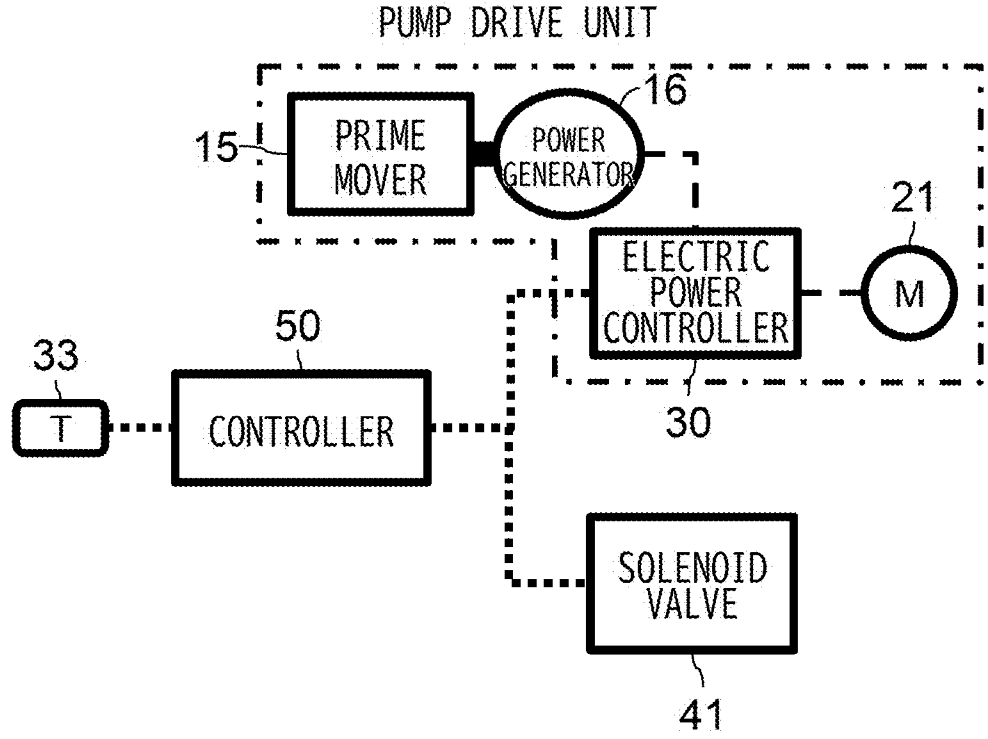
FIG. 5 is an electric circuit diagram of a cooling system for brake cooling oil provided in the transportation vehicle according to the first embodiment of the present invention.

FIG. 5 is an electric circuit diagram of a cooling system of the brake cooling oil. The controller 50 is an on-vehicle computer equipped with a processing device such as a CPU and a storage device such as a memory, and includes a function of controlling the hydraulic pump 19 and the hydraulic motor 25 according to the measured temperature T of the brake cooling oil. The controller 50 outputs a control signal to the electric power controller 30 and the solenoid valve 41 to control the flow rate of the circulating amount of the brake cooling oil in the heat exchanger 24 and the rotation speed of the fan 26.

The electric power controller 30 supplies power supplied from the power generator 16 to the electrically driven motor 21 on the basis of the control signal from the controller 50. Thus, the amount of power supplied to the electrically driven motor 21 is controlled, and the amount of the brake cooling oil supplied to the wet brake 12 in circulation is controlled according to the measured temperature of the brake cooling oil.

On the other hand, the solenoid valve 41 is driven on the basis of the control signal from the controller 50, and the control valve 22 is driven according to the pilot pressure controlled by the solenoid valve 41. Accordingly, the flow rate of the hydraulic fluid supplied to the hydraulic motor 25 is controlled, and the rotation speed of the fan 26 is controlled according to the measured temperature of the brake cooling oil.

Control Table

Figure 6:
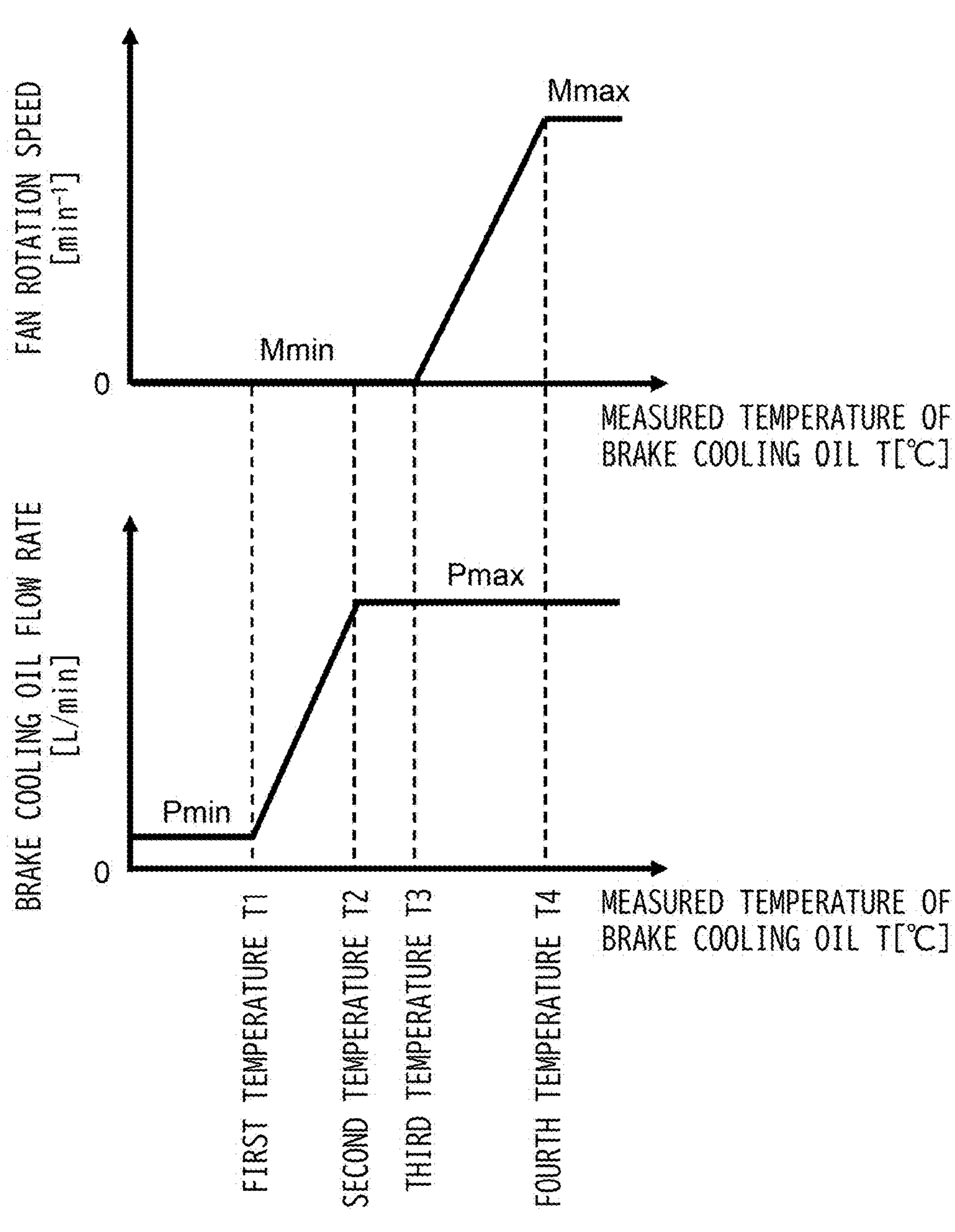
FIG. 6 is a diagram for depicting a control table of a fan rotation speed and a brake cooling oil flow rate to be controlled by a controller provided in the transportation vehicle according to the first embodiment of the present invention.

FIG. 6 is a diagram for depicting a control table of a fan rotation speed and a brake cooling oil flow rate to be controlled by the controller 50. The control table depicted in FIG. 6 is stored in the memory of the controller 50. As values for regulating the control table, a minimum pump rotation speed Pmin (first pump rotation speed), a maximum pump rotation speed Pmax (second pump rotation speed), a minimum motor rotation speed Mmin (first motor rotation speed), a maximum motor rotation speed Mmax (second motor rotation speed), a first temperature T1, a second temperature T2, a third temperature T3, and a fourth temperature T4 are stored, and a relationship of first temperature T1<second temperature T2<third temperature T3<fourth temperature T4 is satisfied. In the present embodiment, the minimum pump rotation speed Pmin is the minimum rotation speed of the hydraulic pump 19, the maximum pump rotation speed Pmax is the maximum rotation speed of the hydraulic pump 19, the minimum motor rotation speed Mmin is the minimum rotation speed of the hydraulic motor 25, and the maximum motor rotation speed Mmax is the maximum rotation speed of the hydraulic motor 25. The minimum pump rotation speed Pmin is associated with the first temperature T1, and the maximum pump rotation speed Pmax is associated with the second temperature T2. The minimum motor rotation speed Mmin is associated with the third temperature T3, and the maximum motor rotation speed Mmax is associated with the fourth temperature T4. The controller 50 determines the rotation speeds of the hydraulic pump 19 and the hydraulic motor 25 by applying, to the control table of FIG. 6, the measured temperature T of the brake cooling oil input from the temperature sensor 33, and outputs a control signal to the electric power controller 30 and the solenoid valve 41.

It should be noted that the flow rate (for example, the delivery flow rate of the hydraulic pump 19) of the brake cooling oil, the rotation speed of the electrically driven motor 21, and the like, which are in a proportional relationship with the rotation speed of the hydraulic pump 19, can be treated as values synonymous with the rotation speed of the hydraulic pump 19 from the viewpoint of a control concept. In FIG. 6, the control table of the rotation speed of the hydraulic pump 19 is regulated by the relationship between the measured temperature T and the flow rate of the brake cooling oil. In accordance with the control table of the rotation speed of the hydraulic pump 19, if the measured temperature T by the temperature sensor 33 is less than the first temperature T1 (T<T1), the controller 50 outputs the control signal to the electric power controller 30 such that the hydraulic pump 19 is driven at the minimum rotation speed Pmin. If the measured temperature T is between the first temperature T1 and the second temperature T2 (T1≤T<T2), the controller 50 outputs the control signal to the electric power controller 30 such that the rotation speed of the hydraulic pump 19 rises from Pmin to Pmax (for example, linearly in proportion) according to the rise of T. Even when T is lowered in T1≤T<T2, the controller 50 lowers the rotation speed of the hydraulic pump 19 in accordance with the control table of FIG. 6 in response to the lowering of T. If the measured temperature T is equal to or higher than the second temperature T2 (T≥T2), the controller 50 outputs the control signal to the electric power controller 30 such that the hydraulic pump 19 is driven at the maximum rotation speed Pmax.

As for the rotation speed of the hydraulic motor 25, a value having a proportional relationship such as the rotation speed of the fan 26 can be treated as a synonymous value from the viewpoint of a control concept. In FIG. 6, the control table of the rotation speed of the hydraulic motor 25 is regulated by the relationship between the measured temperature T of the brake cooling oil and the rotation speed of the fan 26. In accordance with the control table of the rotation speed of the hydraulic motor 25, if the measured temperature T by the temperature sensor 33 is less than the third temperature T3 (T<T3), the controller 50 outputs the control signal to the electric power controller 30 such that the hydraulic motor 25 is driven at the minimum rotation speed Mmin. If the measured temperature T is between the third temperature T3 and the fourth temperature T4 (T3≤T<T4), the controller 50 outputs the control signal to the electric power controller 30 such that the rotation speed of the hydraulic motor 25 rises from Mmin to Mmax (for example, linearly in proportion) according to the rise of T. Even when T is lowered in T3≤T<T4, the controller 50 lowers the rotation speed of the hydraulic motor 19 in accordance to the control table of FIG. 6 in response to the lowering of T. If the measured temperature T is equal to or higher than the fourth temperature T4 (T≥T4), the controller 50 outputs the control signal to the electric power controller 30 such that the hydraulic motor 25 is driven at the maximum rotation speed Mmax.

Pmin

Here, the wet brake 12 incorporates a floating seal (not illustrated) for preventing leakage of the brake cooling oil. The pressure resistance of the floating seal is low, and the pressure of the brake cooling oil applied to the wet brake 12 must be suppressed to less than the pressure resistance of the floating seal. The viscosity of the brake cooling oil increases when the temperature is low, and the pressure inside the wet brake 12 easily increases due to the inflow of the brake cooling oil. Therefore, it is necessary to set the minimum flow rate (minimum rotation speed Pmin of the hydraulic pump 19) such that the floating seal is not damaged even at the lowest oil temperature assumed for the brake cooling oil. However, the minimum rotation speed Pmin of the hydraulic pump 19 is set to a value larger than 0. This is to secure the flowing of the brake cooling oil whose temperature is measured by the temperature sensor 33.

Pmax/Mmax

The maximum pump rotation speed Pmax and the maximum motor rotation speed Mmax are values that regulate the maximum value of the cooling performance of the brake cooling oil. Therefore, it is necessary to set the maximum pump rotation speed Pmax and the maximum motor rotation speed Mmax so as to secure sufficient cooling performance by assuming the maximum heat generation amount of the wet brake 12 that can be generated by braking during the operation of the dump truck 1.

It should be noted that the minimum pump rotation speed Pmin, the maximum pump rotation speed Pmax, the minimum motor rotation speed Mmin, and the maximum motor rotation speed Mmax may be, for example, predetermined rotation speeds or rotation speed ranges set in consideration of the above-described points, or may be lower limit or upper limit rotation speeds set by mechanical and electrical specifications. That is, for example, the maximum pump rotation speed Pmax may be set as the rotation speed of the hydraulic pump 19 higher than the minimum pump rotation speed Pmin. In addition, for example, the maximum motor rotation speed Mmax may be set as the rotation speed of the hydraulic motor 25 higher than the minimum motor rotation speed Mmin.

T1, T2, T3, and T4

Settings of the first temperature T1, the second temperature T2, the third temperature T3, and the fourth temperature T4 will be described. If the first temperature T1, the second temperature T2, the third temperature T3, and the fourth temperature T4 are set low as a whole, the rotation speeds of the hydraulic pump 19 and the hydraulic motor 25 start to increase before the measured temperature T rises so much. In this case, it is advantageous for maintaining the brake cooling oil at a low temperature, and overheating of the brake cooling oil hardly occurs during braking. However, in contrast, the power consumption of the hydraulic pump 19 and the hydraulic motor 25 increases and fuel consumption deteriorates. Therefore, it is desirable to set the first temperature T1, the second temperature T2, the third temperature T3, and the fourth temperature T4 as high as possible in a range where overheating of the brake cooling oil can be avoided from the viewpoint of a balance between cooling performance and fuel consumption.

At this time, as depicted in the control table of FIG. 6, the third temperature T3 is set higher than the first temperature T1. Accordingly, when the measured temperature T rises from a temperature lower than the first temperature T1, the rotation speed of the hydraulic pump 19 starts to rise from the minimum rotation speed Pmin before the rotation speed of the hydraulic motor 25 starts to rise from the minimum rotation speed Mmin. As described above, the minimum rotation speed Pmin of the hydraulic pump 19 is larger than 0, the hydraulic pump 19 continues to be driven at a rotation speed equal to or larger than the minimum rotation speed Pmin during the operation of the dump truck 1, and the brake cooling oil continues to circulate. On the other hand, the minimum rotation speed Mmin of the hydraulic motor 25 is 0, and the fan 26 stops if the measured temperature T is lower than the third temperature T3. If the measured temperature T is low, there is no need to air-cool the brake cooling oil, and thus the temperature is set as described above.

Therefore, on the assumption that the measured temperature T rises beyond the first temperature T1, in a case where the measured temperature T turns to lower without reaching the third temperature T3 as a result of a rise in the rotation speed of the hydraulic pump 19 and an increase in the flow rate of the brake cooling oil, the fan 26 is not driven. In particular, in the present embodiment, since the third temperature T3 is set higher than the second temperature T2, control of the amount of heat radiation is attempted only by controlling the circulation flow rate of the brake cooling oil in a temperature range where the circulation flow rate of the brake cooling oil can be increased or decreased. In addition, in the present embodiment, the heat exchanger 24 is installed on the front surface of the dump truck 1, and the heat exchanger 24 is subjected to travelling wind. Therefore, even in a state where the fan 26 stops, the amount of heat radiation increases in synergy with an increase in the circulation flow rate of the brake cooling oil, and the brake cooling oil is reasonably cooled.

Comparative Example

Figure 8:
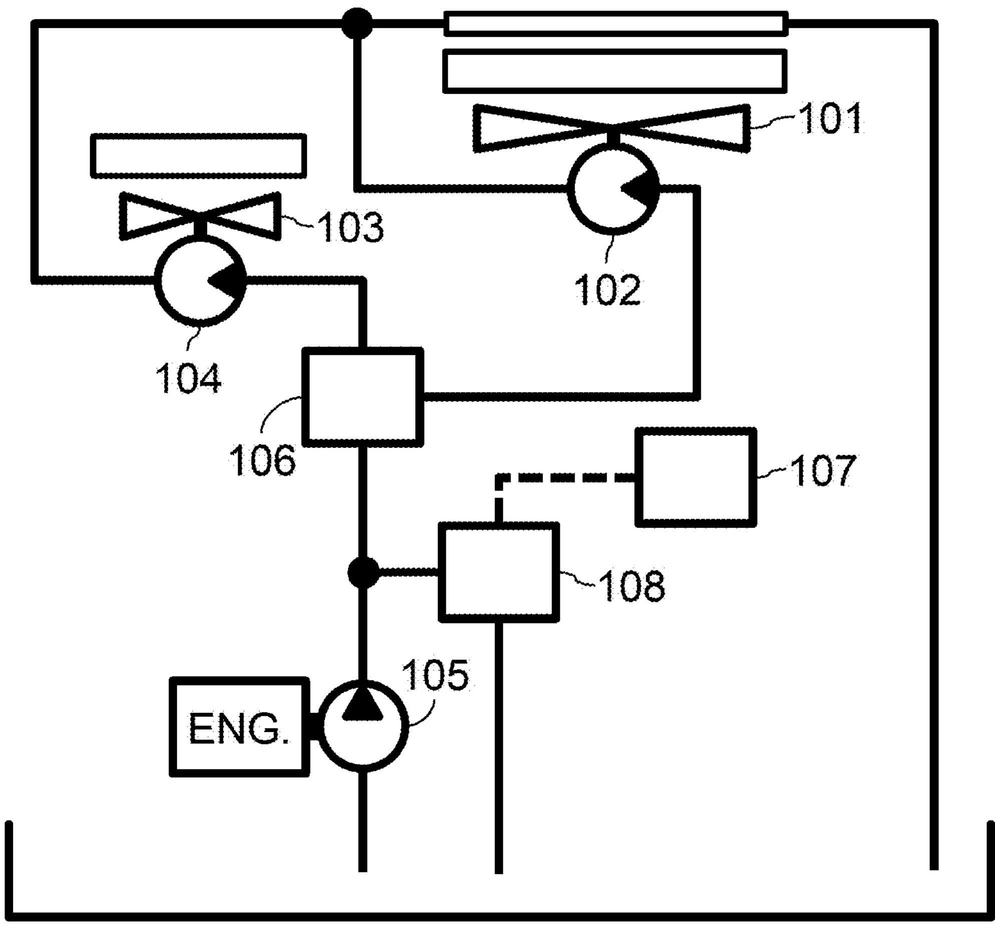
FIG. 8 is a diagram for depicting a hydraulic circuit diagram of a transportation vehicle according to a comparative example.

FIG. 8 is a diagram for depicting a hydraulic circuit diagram of a transportation vehicle according to a comparative example. The hydraulic circuit depicted in the drawing includes a main fan 101, a main hydraulic motor 102, a sub fan 103, a sub hydraulic motor 104, a hydraulic pump 105, a flow priority valve 106, a thermosensing valve 107, and a switching valve 108.

The thermosensing valve 107 outputs an ON signal if the temperature of a fluid to be cooled (for example, engine cooling water) is equal to or higher than a set value, and outputs an OFF signal if the temperature is equal to or lower than the set value. The switching valve 108 is driven by a signal from the thermosensing valve 107 to interrupt/open a delivery line of the hydraulic pump 105. The hydraulic pump 105 is driven by an engine. Where the engine speed is low and the delivery flow rate of the hydraulic pump 105 is equal to or smaller than a predetermined value, the hydraulic fluid is supplied only to the main hydraulic motor 102 through the flow priority valve 106. In contrast, where the engine speed is high and the delivery flow rate is larger than the predetermined value, the hydraulic fluid is supplied to the main hydraulic motor 102 and the sub hydraulic motor 104 through the flow priority valve 106.

In the comparative example having the above configuration, when the temperature of the fluid to be cooled becomes equal to or higher than the set value, an ON signal is output from the thermosensing valve 107, and the delivery line is opened by the switching valve 108. At this time, if the engine speed is equal to or smaller than the predetermined value, the hydraulic fluid is supplied only to the main hydraulic motor 102 through the flow priority valve 106, and only the main fan 101 contributes to cooling the fluid to be cooled. In contrast, if the engine speed is larger than the predetermined value, the hydraulic fluid is supplied to the main hydraulic motor 102 and the sub hydraulic motor 104 through the flow priority valve 106, and the main fan 101 and the sub fan 103 contribute to cooling the fluid to be cooled. Accordingly, switching to one or two fans is performed according to the amount of heat radiation required for the fluid to be cooled.

However, in the comparative example, it is necessary to drive at least one fan when heat radiation of the fluid to be cooled is needed. The power required to drive a large fan of a hydraulic drive type is large, and if one or more fans are always driven regardless of the amount of heat radiation required in a case where heat radiation is needed, fuel consumption of the transportation vehicle deteriorates. In addition, the operation noise of the fan may lead to an increase in fatigue of the operator and a noise problem in the neighborhood.

Effects (1) In the present embodiment, the hydraulic pump 19 for circulating the brake cooling oil, which is a fluid to be cooled, is not driven by an engine but driven by a motor, so that the circulation flow rate of the fluid to be cooled can be controlled regardless of the rotation speed of the prime mover (engine) 15. The hydraulic motor 25 that drives the fan 26 can also be controlled regardless of the engine speed by adjusting the supply flow rate of the hydraulic fluid by the control valve 22.

Further, in the present embodiment, when the hydraulic pump 19 and the hydraulic motor 25 are controlled according to the measured temperature T of the brake cooling oil, the rotation speed of the hydraulic pump 19 starts to rise before the rotation speed of the hydraulic motor 25 starts to rise when the measured temperature T rises (FIG. 6). That is, even if the measured temperature T starts to rise, improvement of the amount of heat radiation is attempted only by increasing the circulation flow rate of the brake cooling oil by the hydraulic pump 19 without driving the fan 26 first. Only in a case where the heat is not sufficiently radiated only by the control of the hydraulic pump 19, the fan 26 is driven according to the required amount of heat radiation in a state where the circulation flow rate of the brake cooling oil is increased. For example, when the measured temperature T rises, in a case where the temperature of the brake cooling oil turns to lower without reaching the third temperature T3 as a result of a rise in the rotation speed of the hydraulic pump 19 and an increase in the flow rate of the brake cooling oil, the fan 26 is not driven in the first place. As described above, the driving frequency and the rotation speed of the fan 26 can be suppressed, the fuel consumption of the dump truck 1 can be improved, and the noise can be suppressed to reduce the fatigue of the operator or the like.

In addition, where the fan 26 is started, since the circulation flow rate of the brake cooling oil in the heat exchanger 24 is always maximum, the cooling efficiency of the brake cooling oil is high with respect to the air flow rate of the fan 26, and the rotation speed of the fan 26 hardly rises. This is also an advantage of the cooperative control of the hydraulic pump 19 and the hydraulic motor 25.

(2) In particular, in the present embodiment, the third temperature T3 at which the fan 26 starts to rotate is set higher than the second temperature T2 at which the rotation speed of the hydraulic pump 19 reaches the maximum rotation speed Pmax. Therefore, the fan 26 does not rotate as long as there is a room for increasing the rotation speed of the hydraulic pump 19 that can improve the amount of heat radiation of the brake cooling oil. Accordingly, the driving frequency of the fan 26 can be further suppressed.

(3) In addition, in the present embodiment, the heat exchanger 24 is installed on the front surface of the dump truck 1, and the travelling wind can be introduced to the heat exchanger 24. When the temperature of the brake cooling oil rises during braking, even in a state where the fan 26 is stopped, an increase in the circulation flow rate of the brake cooling oil can be synergized with an air cooling effect of travelling wind, and the brake cooling oil can be reasonably cooled.

(4) In addition, since the minimum rotation speed Pmin of the hydraulic pump 19 is set to a value larger than 0, the flowing of the brake cooling oil whose temperature is measured by the temperature sensor 33 can be secured. Accordingly, the temperature of the brake cooling oil that is the basis of the control of the hydraulic pump 19 and the hydraulic motor 25 can be properly evaluated, and the reliability of the hydraulic pump 19 and the hydraulic motor 25 can be secured.

(5) If the temperature sensor 33 is provided in the return line (the line connecting the outlet of the wet brake 12 and the tank 13 to each other) of the brake cooling oil, the temperature of the brake cooling oil immediately after the rise in the wet brake 12 is measured, and the measured temperature T rapidly increases or decreases. As a result, even in a situation where the temperature of the brake cooling oil inside the tank 13 does not rise so much, there is a possibility that the control of the hydraulic pump 19 and the hydraulic motor 25 sensitively functions to waste power.

On the other hand, in the present embodiment, since the temperature sensor 33 is installed in the suction line 31 of the hydraulic pump 19, the temperature of the brake cooling oil supplied to the wet brake 12 is measured after the temperature fluctuation is settled in the tank 13, and the sensitive control described above can be suppressed. This also makes it possible to avoid wasteful driving of the fan 26 and the like and to suppress waste of power.

Second Embodiment

Figure 7:
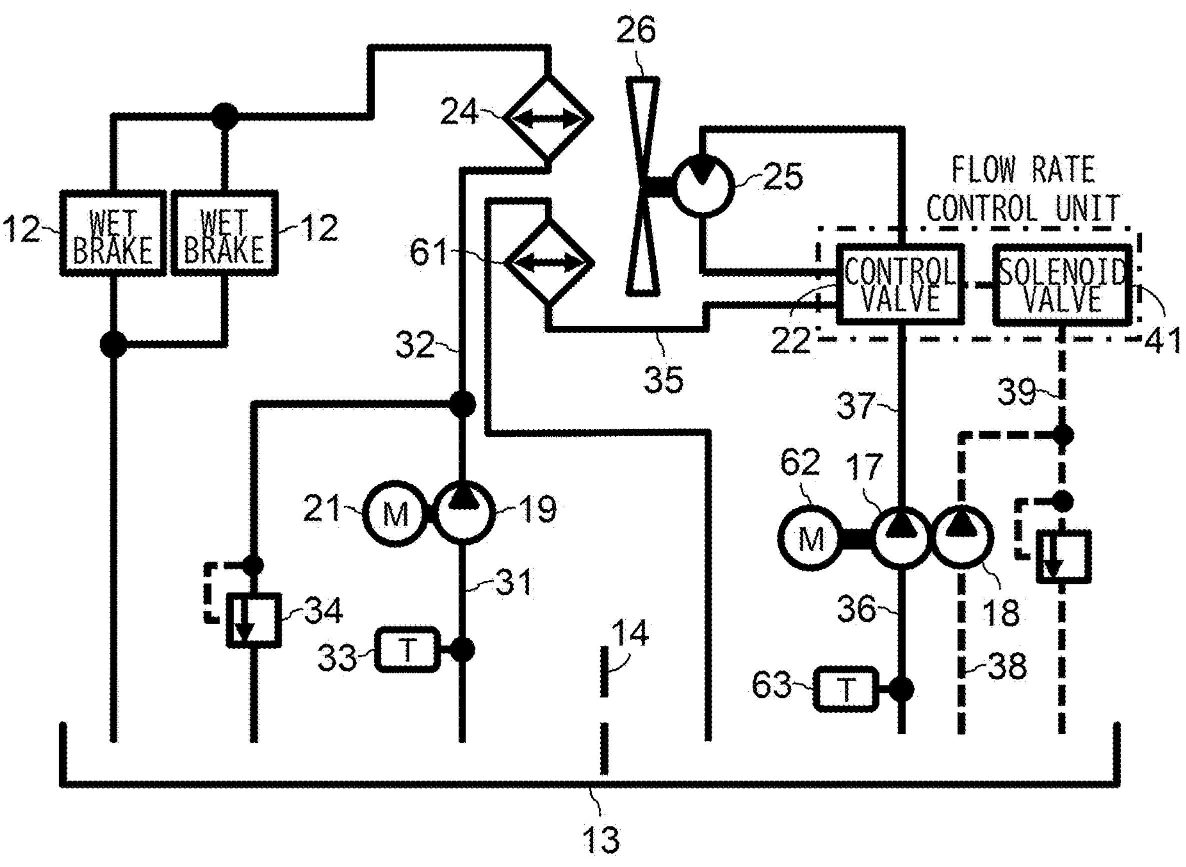
FIG. 7 is a hydraulic circuit diagram of a transportation vehicle according to a second embodiment of the present invention.

FIG. 7 is a hydraulic circuit diagram of a transportation vehicle according to a second embodiment of the present invention. In FIG. 7, elements same as or corresponding to those in the first embodiment are denoted by the same reference numerals as those in FIG. 4, and description thereof is appropriately omitted.

The present embodiment differs from the first embodiment in that the invention is applied to a cooling system for hydraulic working fluid. In the present embodiment, a heat exchanger (hydraulic working fluid cooler) 61 is provided in a center bypass hydraulic line 35. As similar to the heat exchanger 24, the heat exchanger 61 is also installed, for example, on the front surface of the dump truck 1. The fan 26 blows air to the heat exchanger 24 and the heat exchanger 61. In addition, the hydraulic pump 17 is driven by not the prime mover (engine) 15 but an electrically driven motor 62. A temperature sensor 63 for measuring the temperature of the hydraulic working fluid is installed in the suction line 36 of the hydraulic pump 17.

In the present embodiment, the controller 50 controls the rotation speeds of the hydraulic pump 17 and the hydraulic motor 25 for the cooling system for the hydraulic working fluid as similar to the control of the cooling system for the brake cooling oil. A control table related to the control of the hydraulic pump 17 and the hydraulic motor 25 may be set in such a manner that the fan rotation speed and the circulation amount of the hydraulic working fluid change in a manner linked to the temperature of the hydraulic working fluid as similar to the control table depicted in FIG. 6. That is, when the measured temperature T of the hydraulic working fluid from the temperature sensor 63 rises, the rotation speed of the hydraulic pump 17 starts to rise from the minimum rotation speed Pmin (>0) before the rotation speed of the hydraulic motor 25 starts to rise from the minimum rotation speed Mmin (=0). Therefore, when the temperature of the hydraulic working fluid rises, in a case where the measured temperature T of the hydraulic working fluid lowers without reaching the third temperature T3 as a result of a rise in the rotation speed of the hydraulic pump 17 and an increase in the circulation amount of the hydraulic working fluid of the heat exchanger 61, the fan 26 is not driven as far as cooling of the hydraulic working fluid is concerned. The present embodiment is similar to the first embodiment in terms of other configurations.

As described above, the present invention can be applied to a cooling system for hydraulic working fluid or the like other than the brake cooling oil, and similar effects can be obtained.

It should be noted that FIG. 7 depicts a configuration in which the fan 26 is shared by the cooling system for the brake cooling oil and the cooling system for the hydraulic working fluid, and thus the rotation speed of the fan 26 is controlled according to, for example, the maximum values of the measured temperatures T of the brake cooling oil and the hydraulic working fluid. If a configuration in which the air is blown to the heat exchangers 24 and 61 by using individual fans is adopted, the fan for cooling the brake cooling oil can be controlled without depending on the measured temperature of the hydraulic working fluid, and the fan for cooling the hydraulic working fluid can be controlled without depending on the measured temperature of the brake cooling oil.

Modified Example

In the above embodiments, the case where the present invention is applied to the cooling system for the brake cooling oil or the hydraulic working fluid has been described, but the present invention can also be applied to, for example, a cooling system or the like for engine cooling water or engine oil, and similar effects can be obtained. In addition, although the electrically driven motor 21 has been exemplified as the driving device of the hydraulic pump 19, a configuration in which the hydraulic pump 19 is driven by, for example, the hydraulic motor can be adopted as long as the rotation speed of the hydraulic pump 19 can be optionally controlled.

In addition, although the case where the present invention is applied to the dump truck 1 has been exemplified, the present invention can also be applied to other transportation vehicles.

In addition, although the example in which the second temperature T2 is set lower than the third temperature T3 has been described in FIG. 6, the first temperature T1 (<T2) may be lower than the third temperature T3 (<T4) in order to increase the circulation flow rate of the heat exchanger prior to the start of the fan. Therefore, if T1<T3 is satisfied, the second temperature T2 may be equal to or higher than the third temperature T3. However, if a large power reduction effect or the like is to be obtained, it is desirable that the second temperature T2 is lower than the third temperature T3 as exemplified in FIG. 6.

In addition, the configuration in which the fan 26 is stopped when the measured temperature T is lower than the third temperature T3 has been exemplified in the above embodiments, the fan 26 may rotate at a low speed. That is, the minimum rotation speed Mmin of the hydraulic motor 25 may be set larger than 0. However, if a large power reduction effect or the like is to be obtained, it is desirable that Mmin is equal to 0 as exemplified in FIG. 6.

In addition, although the linear control table for the control of the hydraulic pumps 17 and 19 and the hydraulic motor 25 has been exemplified, for example, a control table for changing the rotation speeds of the hydraulic pumps 17 and 19 and the hydraulic motor 25 in a step shape or a curved shape according to the measured temperature T can also be adopted. In the case of the step shape, it is expected that the control becomes simple and the fluctuation of the control of the hydraulic pumps 17 and 19 and the hydraulic motor 25 with respect to the change in the measured temperature T is reduced. However, it is more reasonable to set the control table linearly in that the required amount of heat radiation continuously changes following the measured temperature T because the rotation speeds of the hydraulic pumps 17 and 19 and the hydraulic motor 25 follow in real time according to the measured temperature T.

DESCRIPTION OF REFERENCE CHARACTERS

1: Dump truck (transportation vehicle)
2: Vehicle body frame
8: Vessel
13: Tank
17: Hydraulic pump
19: Hydraulic pump
24: Heat exchanger
25: Hydraulic motor
26: Fan
31: Suction line
33: Temperature sensor
36: Suction line
50: Controller
61: Heat exchanger
63: Temperature sensor
Mmax: Maximum motor rotation speed
Mmin: Minimum motor rotation speed
Pmax: Maximum pump rotation speed
Pmin: Minimum pump rotation speed
T: Measured temperature
T1: First Temperature
T2: Second Temperature
T3: Third temperature
T4: Fourth temperature

The invention claimed is:

1. A transportation vehicle including a vehicle body frame and a vessel provided on the vehicle body frame so as to be capable of rising and falling, the transportation vehicle comprising:

a tank that stores a fluid to be cooled;

a heat exchanger that cools the fluid to be cooled;

a pump that circulates the fluid to be cooled between the tank and the heat exchanger;

a temperature sensor that detects a temperature of the fluid to be cooled;

a fan that blows air to the heat exchanger;

a hydraulic motor that drives the fan; and a controller that controls the pump and the hydraulic motor according to the temperature detected by the temperature sensor, wherein the controller stores a first pump rotation speed, a first temperature associated with the first pump rotation speed, a second pump rotation speed higher than the first pump rotation speed, a second temperature associated with the second pump rotation speed, a first motor rotation speed, a third temperature associated with the first motor rotation speed, a second motor rotation speed higher than the first motor rotation speed, and a fourth temperature associated with the second motor rotation speed, is configured to raise a rotation speed of the pump from the first pump rotation speed to the second pump rotation speed according to a rise in the detected temperature when the detected temperature is between the first temperature and the second temperature, and raise a rotation speed of the hydraulic motor from the first motor rotation speed to the second motor rotation speed according to a rise in the detected temperature when the detected temperature is between the third temperature and the fourth temperature, and the third temperature is set higher than the first temperature, and the controller is configured to start the rotation speed of the pump to be raised from the first pump rotation speed when the detected temperature reaches the first temperature from a temperature lower than the first temperature, raise the rotation speed of the pump from the first pump rotation speed without raising the rotation speed of the hydraulic motor until the third temperature is reached when the detected temperature rises beyond the first temperature, and start the rotation speed of the hydraulic motor to be raised from the first motor rotation speed when the detected temperature reaches the third temperature.

2. The transportation vehicle according to claim 1, wherein a minimum rotation speed of the pump is a value larger than 0, and a minimum rotation speed of the hydraulic motor is 0.

3. The transportation vehicle according to claim 1, wherein the third temperature is higher than the second temperature.

4. The transportation vehicle according to claim 1, wherein the temperature sensor is installed in a suction line of the pump.

5. The transportation vehicle according to claim 1, wherein the fluid to be cooled is a brake cooling oil.

6. The transportation vehicle according to claim 1, wherein the fluid to be cooled is a hydraulic working fluid.

* * * * *